United States Patent
Martin et al.

(10) Patent No.: US 6,502,180 B1
(45) Date of Patent: Dec. 31, 2002

(54) ASYNCHRONOUS CIRCUITS WITH PIPELINED COMPLETION PROCESS

(75) Inventors: Alain J. Martin, Pasadena, CA (US); Andrew M. Lines, Pasadena, CA (US); Uri V. Cummings, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/496,128

(22) Filed: Feb. 1, 2000

Related U.S. Application Data

(63) Continuation-in-part of application No. 09/118,140, filed on Jul. 16, 1998.
(60) Provisional application No. 60/058,662, filed on Sep. 12, 1997.

(51) Int. Cl.[7] .............................................. G06F 15/82
(52) U.S. Cl. ...................................................... 712/25
(58) Field of Search ............................. 712/10, 11, 18, 712/25

(56) References Cited

U.S. PATENT DOCUMENTS

| | | | | |
|---|---|---|---|---|
| 3,290,511 A | * | 12/1966 | Sims | |
| 4,466,064 A | * | 8/1984 | Martin | 712/13 |
| 4,580,215 A | * | 4/1986 | Morton | 708/215 |
| 4,720,780 A | * | 1/1988 | Dolecek | 370/428 |
| 4,876,641 A | * | 10/1989 | Cowley | 712/13 |
| 4,905,143 A | * | 2/1990 | Takahashi et al. | 712/11 |
| 4,922,418 A | * | 5/1990 | Dolecek | 708/522 |
| 5,187,800 A | * | 2/1993 | Sutherland | 712/18 |
| 5,410,723 A | * | 4/1995 | Schmidt et al. | 710/57 |
| 5,574,925 A | * | 11/1996 | Paver | 712/25 |
| 5,689,661 A | * | 11/1997 | Hayashi et al. | 710/316 |
| 5,732,233 A | * | 3/1998 | Klim | 712/200 |
| 5,752,070 A | * | 5/1998 | Martin | 712/33 |
| 5,848,276 A | * | 12/1998 | King et al. | 709/107 |
| 5,872,988 A | * | 2/1999 | Duranton | 712/1 |
| 5,937,177 A | * | 8/1999 | Molnar et al. | 712/18 |
| 6,122,726 A | * | 9/2000 | Wise et al. | 382/232 |

OTHER PUBLICATIONS

Burns et al., "Syntax–directed Translation of Concurrent programs into Self–timed Circuits", Advanced Research in VLSI. Proceedings of the 50th MIT Conference. MIT Press, pp. 35–50, 1988.*

Burns et al., "Synthesis of self–timed Circuits by Program Translation", The Fusion of hardware Design and Verification, p. 1–18, 1988.*

Furber, "Four–phase micropipeline latch control circuits", IEEE Transactions on VLSI systems, p. 247–253, Jun. 1996.*

Kearney, "Performance evaluation of asynchronous logic pipelines with data dependent processing", proceedings., 2nd Working Conference on Asynchronous Design methodologies, 4–13, May 1995.*

Endecott, "Superscalar instruction issue in an asynchronous microprocessor", IEEE Proceedings on Computers and Design Techniques, p. 266–272, Sep. 1996.*

(List continued on next page.)

*Primary Examiner*—John F. Niebling
*Assistant Examiner*—Stacy Whitmore
(74) *Attorney, Agent, or Firm*—Fish & Richardson P.C.

(57) ABSTRACT

An asynchronous circuit having a pipelined completion mechanism to achieve improved throughput.

10 Claims, 8 Drawing Sheets

OTHER PUBLICATIONS

Cho et al., "Design of a 32–bit fully asynchronous microprocessor (FAM)", Proceedings of the 35th Midwest Symposium on Circuits and Systems, p. 1500–1503, vol. 2, Aug. 1992.*

Furber et al., "Dynamic logic in four–phase micropipelines", Proceedings, 2nd International Symposium on Advances Research in Asynchronous Circuits and systems., p. 11–16, Mar. 1996.*

Martin, "Asynchronous datapaths and the design of an asynchronous adder", Dept. of Computer Science, California Institute of Technology. p. 1–23, Jun. 1996.*

Furber et al., Four–Phase Micropipeline Latch Control Circuits, 06/96, IEEE Transactions on VLSI Systems.

Cho et al., Design of a 32–bit Fully Asynchronous Microprocessor (FAM), 08/92, Proceedings of the 35th Midwest Symposium on Circuits and Systems.

Furber et al., Dynamic Logic in Four–Phase Micropipelines, 03/96, 2nd International Symposium on Advanced Research in Asynchronous Circuits and Systems.

Kearney et al., Performance Evaluation of Asynchronous Logic Pipelines with Data Dependent Processing Delays, 05/95, Proceedings, 2nd Working Conference on Asynchronous Design Methodologies.

Martin, Asynchronous Datapaths and the Design of an Asynchronous Adder, 06/91, Department of Computer Science, California Institute of Technology.

Burns et al., Synthesis of Self–Timed Circuits by Program Transformation, 1988, The Fusion of Hardware Design and Verification.

Burns et al., Syntax–directed Translation of Concurrent Programs into Self–timed Circuits, 1988, Advanced Research in VLSI. Proceedings of the 5th MIT Conference.

Endecott, Superscalar Instruction Issue in an Asynchronous Microprocessor, 06/96, Computers and Digital Techniques, IEEE Proceedings.

* cited by examiner

ASYNCHRONOUS CIRCUITS WITH PIPELINED COMPLETION PROCESS

This application is a divisional of U.S. patent application No. 09/151,334, filed Sep. 11, 1998, now U.S. Pat No. 6,038,656, which claims the benefit of U.S. provisional No. 60/058,662 filed Sep. 12, 1997 and which is a continuation-in-part of U.S. patent application No. 09/118,140 filed Jul. 16, 1998, now U.S. Pat. No. 6,381,692.

U.S. Government may have certain rights in this invention pursuant to DARPA Grant No. DAAH04-94-G-0274.

FIELD OF THE INVENTION

The present invention relates to information processing, and more specifically to architecture and operation of asynchronous circuits and processors.

BACKGROUND

Many information processing devices operate based on a control clock signal to synchronize operations of different processing components and therefore are usually referred to as "synchronous" processing devices. In general, different processing components may operate at different speeds due to various factors including the nature of different functions and different characteristics of the components or properties of the signals processed by the components. Synchronization of these different processing components requires the speed of the control clock signal to accommodate the slowest processing component. Thus, some processing components may complete respective operations earlier than other slow components and have to wait until all processing components complete their operations. Although the speed of a synchronous processor can be improved by increasing the clock speed to a certain extent, synchronous processing is not an efficient way of utilizing available resources.

An alternative approach, pioneered by Alain Martin of California Institute of Technology, eliminates synchronization of different processing components according to a clock signal. Different processing components simply operate as fast as permitted by their structures and operating environments. There is no relationship between a clock speed and the operation speed. This obviates many technical obstacles in a synchronous processor and can be used to construct an "asynchronous" processor with a much simplified architecture and a fast processing speed that are difficult to achieve with synchronous processors.

U.S. Pat. No. 5,752,070 to Martin and Burns discloses such an asynchronous processor, which is incorporated herein by reference in its entirety. This asynchronous processor goes against the conventional wisdom of using a clock to synchronize various components and operations of the processor and operates without a synchronizing clock. The instructions can be executed as fast as the processing circuits allow and the processing speed is essentially limited only by delays cased by gates and interconnections.

Such an asynchronous processor can be optimized for high-speed processing by special pipelining techniques based on unique properties of the asynchronous architecture. Asynchronous pipelining allows multiple instructions to be executed at the same time. This has the effect of executing instructions in a different order than originally intended. An asynchronous processor compensates for this out-of-order execution by maintaining the integrity of the output data. without a synchronizing clock signal.

Asynchronous processor relies on the control clock signal to indicate when an operation of a component is completed and when the next operation of another component may start. By eliminating such synchronization of a control clock, a pipelined processing component in an asynchronous processor, however, generates a completion signal instead to inform the previous processing component the completion of an operation.

For example, assume P1 and P2 are two adjacent processing components in an asynchronous pipeline. The component P1 receives and processes data X to produce an output Y. The component P2 processes the output Y to produce a result Z. At least two communication channels are formed between P1 and P2: a data channel that sends Y from P1 to P2 and a request/acknowledgment channel by which P2 acknowledges receiving of Y to P1 and requests the next Y from P1. The messages communicated to P1 via the request/acknowledgment channel are produced by P2 according to a completion signal internal to P2.

Generation of this completion signal can introduce an extra delay that degrades the performance of the asynchronous processor. Such extra delay is particularly problematic when operations of a datum are decomposed into two or more concurrent elementary operations on different portions of the datum. Each elementary operation requires a completion signal. The completion signals for all elementary operations are combined into one global completion signal that indicates completion of operations on that datum. Hence, a completion circuit ("completion tree") is needed to collect all elementary completion signals to generate that global completion signal. The complexity of such a completion tree increases with the number of the elementary completion signals.

When not properly implemented, the extra delays of a completion tree can significantly offset the advantages of an asynchronous processor. Therefore, it is desirable to reduce or minimize the delays in a completion tree.

SUMMARY

The present disclosure provides a pipelined completion tree for asynchronous processors. A high throughput and a low latency can be achieved by decomposing any pipeline unit into an array of simple pipeline blocks. Each block operates only on a small portion of the datapath. Global synchronization between stages, when needed, is implemented by copy trees and slack matching.

More specifically, one way to reduce the delay in the completion tree uses asynchronous pipelining to decompose a long critical cycle in a datapath into two or more short cycles. One or more decoupling buffers may be disposed in the datapath between two pipelined stages. Another way to reduce the delay in the-completion tree is to reduce the delay caused by distribution of a signal to all N bits in an N-bit datapath. Such delay can be significant when N is large. The N-bit datapath can also be partitioned into m small datapaths of n bits (N=m×n) that are parallel to one another. These m small datapaths can transmit data simultaneously. Accordingly, each N-bit processing stage can also be replaced by m small processing blocks of n bits.

One embodiment of the asynchronous circuit uses the above two techniques to form a pipelined completion tree in each stage to process data without a clock signal. This circuit comprises a first processing stage receiving an input data and producing a first output data, and a second processing stage, connected to communicate with said first processing stage without prior knowledge of delays associated with said first and second processing stages and to receive said first output data to produce an output. Each processing stage includes:

a first register and a second register connected in parallel relative to each other to respectively receive a first portion and a second portion of a received data, a first logic circuit connected to said first register to produce a first completion signal indicating whether all bits of said first portion of said received data are received by said first register, a second logic circuit connected to said second register to produce a second completion signal indicating whether all bits of said second portion of said received data are received by said second register, a third logic circuit connected to receive said first and second completion signals and configured to produce a third completion signal to indicate whether all bits of said first and second portions of said received data are received by said first and second registers, a first buffer circuit connected between said first logic circuit and the third logic circuit to pipeline said first and third logic circuits, and a second buffer circuit connected between said second logic circuit and the third logic circuit to pipeline said second and third logic circuits.

These and other aspects and advantages will become more apparent in light the following accompanying drawings, the detailed description, and the appended claims.

DETAILED DESCRIPTION OF THE PREFERRED EMBODIMENTS

The asynchronous-circuits disclosed herein are quasi delay-insensitive in the sense that such circuits do not use any assumption on, or knowledge of, delays in most operators and wires. One of various implementations of such quasi-delay-insensitive communication is a four-phase protocol for communication between two adjacent processing stages in an asynchronous pipeline. This four-phase protocol will be used in the following to illustrate various embodiments and should not be construed as limitations of the invention.

Figure 1:
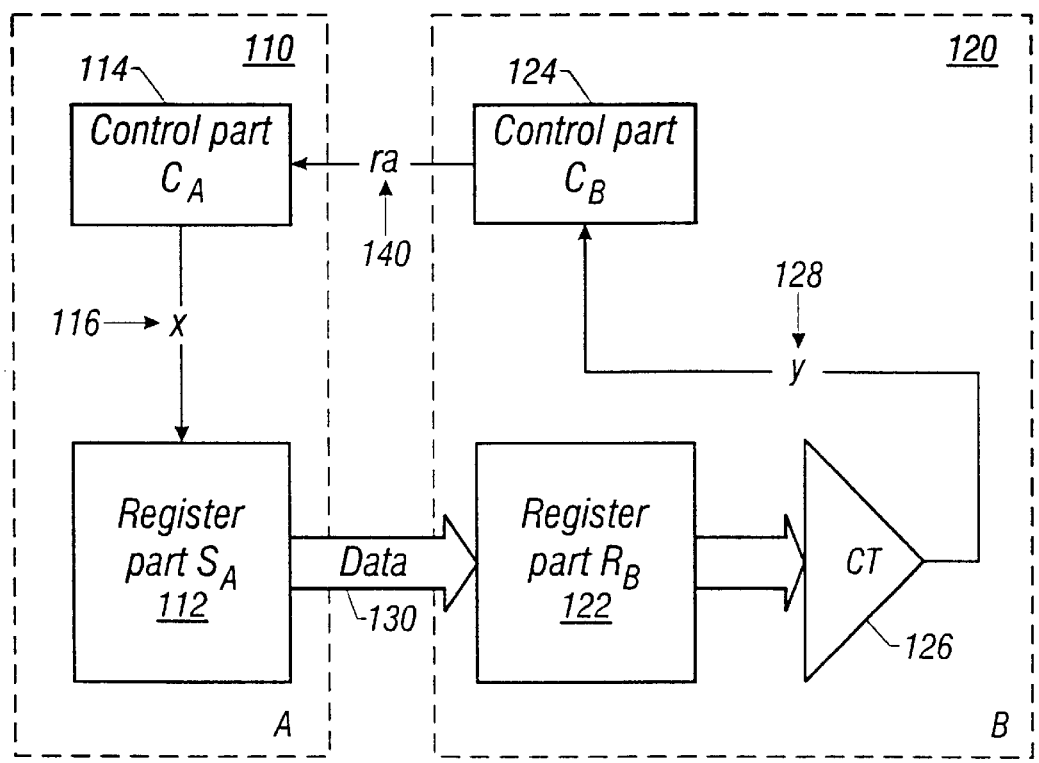
FIG. 1 shows two communicating processing stages in an asynchronous pipeline circuit based on a quasi-delay-insensitive four-phase handshake protocol.

FIG. 1 is a block diagram showing the implementation of the four-phase protocol in an asynchronous pipeline. Two adjacent stages (or processing components) 110 ("A") and 120 ("B") are connected to send an N-bit data from the first stage 110 to the second stage 120 via data channels 130. A communication channel 140 is implemented to send a request/acknowledgment signal "ra" by the second stage 120 to the first stage lid. The signal ra either requests data to be sent or acknowledges reception of data to the first stage 110. The processing stages 110 and 120 are not clocked or synchronized to a control clock signal.

The first stage 110 includes a register part $R_A$, 112, and a control part "$C_A$", 114. The register part 112 stores data to be sent to the second stage 120. The control part 114 generates an internal control parameter "x" 116 to control the register part 112 and the data channels 130, e.g., triggering sending data or resetting the data channels 130. The control part 114 also controls data processing in the first stage 110 which generates the data to be sent to the second stage 120. The second stage 120 includes a register part 122 that stores received data from register part 112, a control part "$C_B$", 124, that generates the request/acknowledgment signal ra over the channel 140 and controls data processing in the second stage 120, and a completion tree 126 that connects the register part 122 and the control part 124.

The completion tree 126 is a circuit that checks the status of the register part 122 and determines whether the processing of the second stage 120 on the received data from the first stage 110 is completed. An internal control parameter "y" 128 is generated by the completion tree 126 to control the operation of the control part 224.

One possible four-phase handshake protocol is as follows. When the completion tree 126 detects that the second stage 120 has completed processing of the received data and is ready to receive the next data from the first stage 110, a request signal is generated by the control part 124 in response to a value of the control parameter y (128) and is sent to the control part 114 via the channel 140 to inform the first stage 110 that the stage 120 is ready to receive the next data. This is the "request" phase.

Next, in a data transmission phase, the first stage 110 responds to the request by sending out the next data to the second stage 120 via the data channels 130. More specifically, the control part 114 processes the request from the control part 124 and instructs the register part 112 by using the control parameter x (116) to send the next data.

An acknowledgment phase follows. Upon completion of receiving the data from the first stage 110, the completion tree 126 changes the value of-the control parameter y (128) so that the control part 124 produces an acknowledgment signal via the channel 140 to inform the first stage 110 (i.e., the control part 114) of completion of the data transmission.

Finally, the control part 114 changes the value of the control parameter x (116) which instructs the register part 112 to stop data transmission. This action resets the data channels 130 to a "neutral" state so that the next data can be transmitted when desired. In addition, the completion tree 126 resets the value of the control parameter y to the control part 124 to produce another request. This completes an operation cycle of request, data transmission, acknowledgment, and reset.

No clock signal is used in the above communication protocol. Each processing component or stage operates as fast as possible to complete a respective processing step and then proceeds to start the next processing step. Such asynchronous pipelined operation can achieve a processing speed, on average, higher than that of a synchronous operation.

Since the operation is asynchronous, the binary data should be coded with delay-insensitive codes. One simple way of coding data in a delay-insensitive manner is a "dual-rail" code in which each bit is encoded on two wires. Another delay-insensitive code is a 1-of-N code in which one rail is raised for each bit value of the data. See, e.g., U.S. Pat. No. 3,290,511. A delay-insensitive code is characterized by the fact that the data rails alternate between a neutral state that doesn't represent a valid encoding of a data value, and a valid state that represents a valid encoding of a data value. See, Alain J. Martin, "Asynchronous Data paths and the Design of an Asynchronous Adder" in Formal Methods in System Design, 1:1, Kluwer, 117–137, 1992.

The above four-phase protocol can be broken down into a set phase and a rest phase. The set phase includes the sequence of transitions performed in the request phase and the transmission phase (assuming that all wires are initially set low):

$$ra\uparrow; x\uparrow; D\Uparrow; y\uparrow.$$

Each transition is a process where a signal (e.g., ra, x, D, or y) changes its value. The reset phase includes the sequence of transitions in the acknowledgment phase and the final reset phase:

$$ra\downarrow; x\downarrow; D\Downarrow; y\downarrow.$$

The above operations are expressed in the handshake expansion ("HSE") notation as defined in the incorporated U.S. Pat. No. 5,752,070. The semicolon indicates two statements to be executed in sequence; the $v\uparrow$ and $v\downarrow$ set a boolean variable v to true and false, respectively; $C\Uparrow$ is the concurrent assignment of some bits of C such that the result is an appropriate valid value without any intermediate value being valid; and $C\Downarrow$ is the concurrent assignment of some bits of C such that the result is a neutral value without any intermediate value being neutral.

The false value, $y\downarrow$, of the completion signal y represents completion of processing and instructs the control part 124 to send out a request. The true value, $y\uparrow$, represents completion of receiving data and instructs the control part 124 to send out an acknowledgment. The architecture of the completion tree 126 and the generation of the completion signals, $y\downarrow$ and $y\uparrow$, are now described in detail.

Consider an N-bit datum, D that is transmitted from the first stage 110 to the second stage 120. The completion signal $y\uparrow$ is generated when all the bits encoded into D have been written into the register 122 from the register 112. For each bit $b_k$ (k=0, 1, . . . , N−1), a write-acknowledgment signal, $wack_k$, is generated. When all write-acknowledgment signals are raised, y can be raised to produce the completion signal $y\uparrow$. Similarly, $wack_k$ is lowered when the corresponding bit $b_x$ is reset to its neutral value according to a chosen delay-insensitive protocol. Hence, y can be reset to zero when all write-acknowledgment signals are reset to zero (the neutral value). This can be expressed as the following:

$$wack_0 \wedge wack_1 \wedge \ldots \wedge wack_{N-1} \rightarrow y\uparrow$$
$$\neg wack_0 \wedge \neg wack_1 \wedge \ldots \wedge \neg wack_{N-1} \rightarrow y\downarrow$$

where the notation "¬" represents negation, thus if $wack_0$ represents a "high", $\neg wack_0$ represents a "low".

Figure 2:
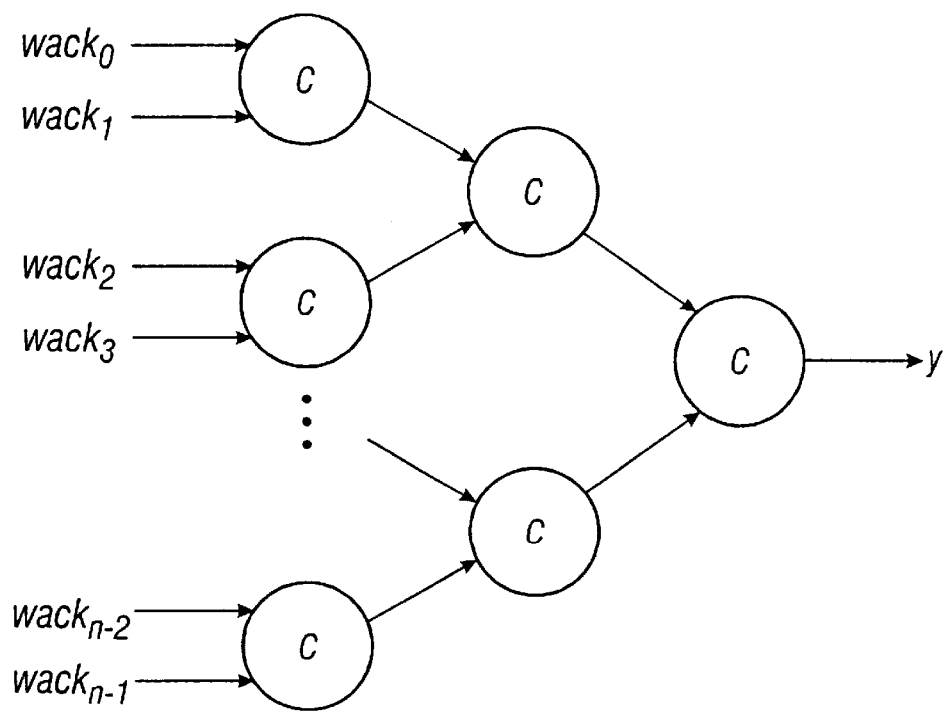
FIG. 2 shows a prior-art completion tree formed by two-input C-elements.

The completion tree 126 is constructed and configured to perform the above logic operations to generate the proper completion signals (i.e., either $y\downarrow$ and $y\uparrow$). For any reasonably large value of N, one conventional implementation of the completion tree uses a tree of two-input C-elements as shown in FIG. 2. The two-input C-element (also known as Muller C element) is a logic gate which outputs a high or low only when both inputs are high or low, respectively, and the output remains unchanged from a previous value if the inputs are different from each other.

The number of C-elements in FIG. 2 may be reduced by using C-elements of more than two inputs, such as three or even four inputs. However, the existing VLSI technology limits the number of inputs in such C-elements since as the number of p-transistors connected in series to form the C-elements increases, the performance of the C-elements is usually degraded. In general, the number of the inputs of a C-element may be up to 4 with acceptable performance.

Measurements show that the type of C-element used to construct the completion tree is in general not very important. What is important is that whatever tree is used, the delay through the tree is proportional to logN. The delays through the tree are roughly a constant for C-elements of two inputs, three inputs, or four inputs.

The two communicating components are said to complete a "cycle" if, after a sequence of transitions, both components return to their respective initial states at the beginning of the sequence. For example, the set phase and the reset phase of transitions in communication between A and B shown in FIG. 1 form a cycle C:

$$C = ra\uparrow; x\uparrow; D\Uparrow; y\uparrow; ra\downarrow; x\downarrow; D\Downarrow; y\downarrow.$$

The throughput of an asynchronous system is determined by the delay through the longest cycle of transitions. Such a cycle is called a "critical cycle." Therefore, it is desirable to reduce the critical cycle to improve the throughput.

For a quasi-delay-insensitive asynchronous system in which any two components communicate according to the above four-phase protocol, a delay δc through the sequence C is a good estimated lower-bound for the critical cycle delay.

For a normal datapath with n=32 or n=64, the completion tree delays, $\delta(y\uparrow)$ and $\delta(y\downarrow)$, may be unacceptable, if a high throughput is required. For example, in the Caltech MiniMIPS design, the target throughput in the 0.6-$\mu$m CMOS technology is around 300 MHZ. The critical cycle delay is thus about 3 ns. For a full 32-bit completion tree based on the structure shown in FIG. 2, the completion tree delay is around 1 ns. Hence, one third of the critical cycle delay is caused by the completion tree. This is a significant portion of the critical delay.

The significant contribution to the critical cycle delay from the completion tree is a common drawback of previous asynchronous systems. To certain extent, such a limitation has prevented many from developing asynchronous systems as an alternative to the dominating synchronous systems in spite of many advantages of asynchronous systems. Hence, it is important to design and configure a completion tree with a significantly reduced delay to make an asynchronous system practical.

Figure 3A:
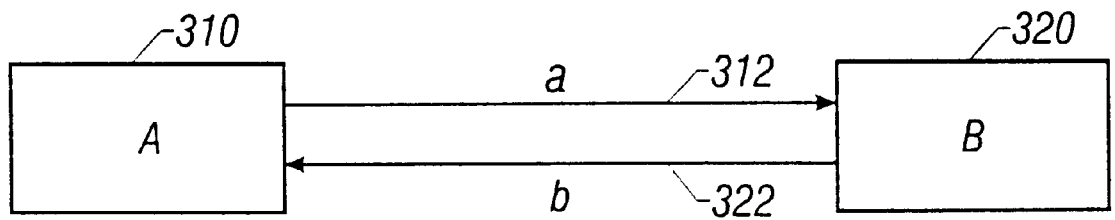
FIG. 3A is a simplified diagram showing the asynchronous pipeline in FIG. 1.
Figure 3B:
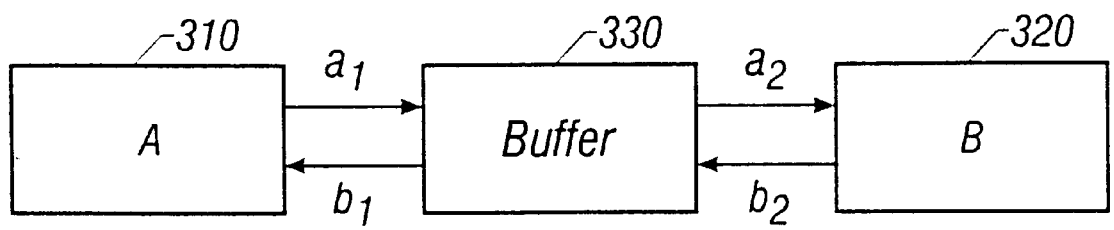
FIG. 3B shows an improved asynchronous pipeline with a decoupling buffer connected between two processing stages.

One way to reduce the delay in the completion tree uses asynchronous pipelining to decompose a long critical cycle in a datapath into two or more short cycles. FIGS. 3A and 3B show an example of breaking a long critical cycle between two pipelined stages A and B into two short cycles by pipelining A and B through a buffer.

FIG. 3A shows two components 310 (A) and 320 (B) communicate with each other through two simple handshake channels 312 (a) and 322 (b). The protocol may include the following sequence of transitions:

$$A\uparrow;a\uparrow;B\uparrow;b\uparrow;A\downarrow;a\downarrow;B\downarrow;b\downarrow$$

where $A\uparrow$, $B\uparrow$, $A\downarrow$, $B\downarrow$ represent the transitions inside A and B. If the delay through this cycle is too long to be acceptable (e.g., due to the delays through A and B), a simple buffer 330 can be introduced to form an asynchronous pipelining between A and B as in FIG. 3B to reduce this long cycle into two short cycles.

The buffer 330 creates two handshake cycles:

$$Bu1 = A\uparrow;a1\uparrow;b1\uparrow;A\downarrow;a1\downarrow;b1\downarrow,$$

and $$Bu2 = a2\uparrow;B\uparrow;b2\uparrow;a2\downarrow;B\downarrow;b2\downarrow.$$

If the delays of the transitions $Bu1\uparrow$, $Bu1\downarrow$ and $Bu2\uparrow$, $Bu2\downarrow$ are shorter than the delays of $A\uparrow$,$A\downarrow$ and $B\uparrow$,$B\downarrow$, the above decomposition reduces the length of the critical cycle.

Figure 3C:
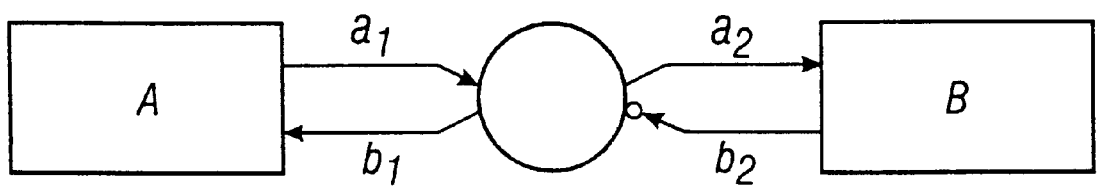
FIG. 3C shows one implementation of the circuit of FIG. 3D using a C-element as the decoupling buffer.

The two handshakes are synchronized by the buffer, not by a clock signal. The buffer can be implemented in various ways. FIG. 3C shows one simple implementation that uses a single C-element 340 of two inputs a1, b2 and two outputs a2, b1. The C-element 340 receives the input a1 and an inverted input of b2 to produce two duplicated outputs a2, b1. The two handshakes are synchronized in the following way:

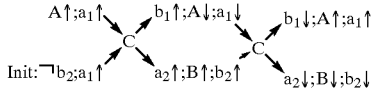

This particular buffer allows the downgoing phase of A to overlap with the upgoing phase of B and the upgoing phase of A to overlap with the downgoing phase of B. Such overlap reduces the duration of the handshaking process.

Therefore, when a decoupling buffer is properly implemented, adding additional stages in an asynchronous pipeline may not necessarily increase the forward latency of the pipeline and may possibly reduce the forward latency.

The above technique of decomposing a long cycle into two or more pipelined short cycles can reduce the delay along the datapath of a pipeline. However, this does not address another delay caused by distribution of a signal to all N bits in an N-bit datapath, e.g., controlling bits in a 32-bit register that sends out data (e.g., the register 112 in the stage 110). Such delay can also be significant, specially when N is large (e.g., 32 or 64 or even 128). Hence, in addition to adding additional pipelined stages along a datapath, an N-bit datapath can also be partitioned into m small datapaths of n bits (N=m×n) to further reduce the overall delay. These m small. datapaths are connected parallel to one another and can transmit data simultaneously relative to one another. Accordingly, the N-bit register of a stage in the N-bit datapath can also be replaced by m small registers of n bits. The number m and thereby n are is determined by the processing tasks of the two communicating stages. A 32-bit datapath, for example, can be decomposed into four 8-bit blocks, or eight 4-bit blocks, or sixteen 2-bit blocks, or even thirty-two 1-bit blocks to achieve a desired performance.

Therefore, decomposition of a long cycle into two or more small cycles can be applied to two directions: one along the pipelined stages by adding decoupling buffers therebetween and another "orthogonal" direction by decomposing a single datapath into two or more small datapaths that are connected in parallel.

Figure 4:
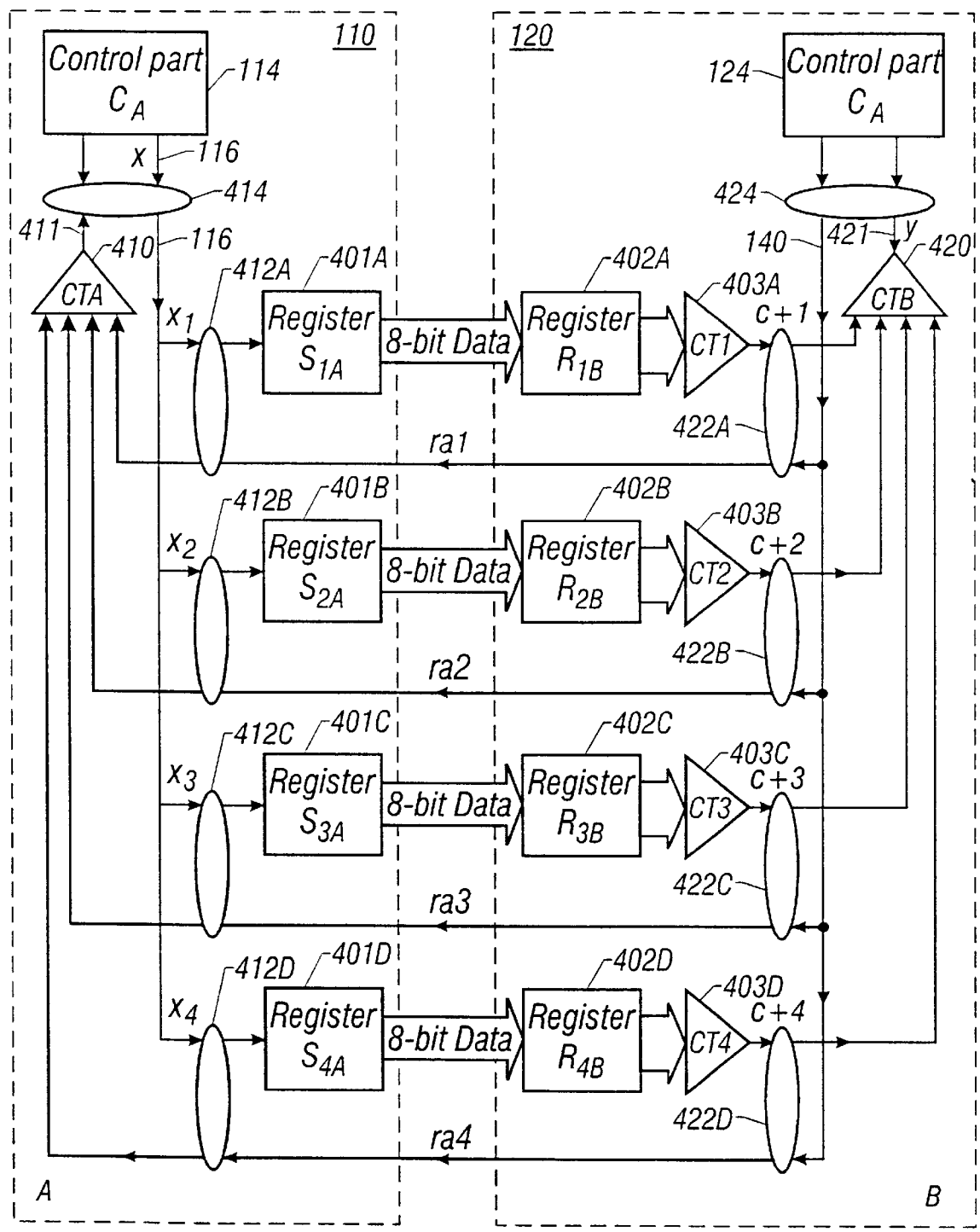
FIG. 4 shows an asynchronous circuit implementing a pipelined completion tree and a pipelined distribution circuit in each processing stage.

FIG. 4 shows a 32-bit asynchronous pipeline with a pipelined completion tree based on the above two-dimensional decomposition. Four 8-bit registers 401A, 401B, 401C, 401D in the sending stage 110 are connected with respect to one another in parallel. Accordingly, four 8-bit registers 402A, 402B, 402C, 402D in the receiving stage 120 that respectively correspond to the registers in the sending stage 110 are also connected with respect to one another in parallel. This forms four parallel 8-bit datapaths. Each datapath has an 8-input completion tree (e.g., 403A, etc.), and the four completion outputs ctk (k=1, 2, 3, and 4) are combined into one 4-input completion tree 420 that produces a completion signal 421 (ra) for the control 124. This accomplishes one half of the two-dimensional decomposition.

Decomposition along the datapaths is accomplished by using the decoupling buffer shown in FIGS. 3B and 3C. A completion tree 410 is introduced in the sending stage 110 to receive individual request/acknowledge signals rak (k=1, 2, 3, and 4) directly from individual 8-bit datapaths and thereby to produce a duplicate request/acknowledge signal 411 of the request/acknowledge signal 140 produced by the control part 124. The control part 114 responds to this signal 411 to control the registers 401A, 401B, 401C, and 401D to send the next data.

At least two decoupling buffers, such as 412A and 422A, are introduced in each datapath with one in the sending stage 110 and another in the receiving stage 120. The buffer 412A, for example, is disposed on wires (ct1,ra1) to interconnect the control part 114, the completion tree 410, register 401A, and the request/acknowledge signal for the first datapath. The buffer 422A is disposed on wires (x1, ra1) to interconnect the first completion tree 403A, the control part 124, the completion tree 420, and the completion tree 410.

Therefore, the completion trees 403A, 403B, 403C, and 403D are pipelined to the completion tree 420 via buffers 422A, 422B, 422C, and 422D, respectively. Similarly, the completion trees in the stage 110 are also pipelined through buffers 412A, 412B, 412C, and 412D. Such pipelined completion significantly reduces the delay in generating the completion signal for the respective control part. The above decoupling technique can be repeated until all completion trees have a delay below an acceptable level to achieve a desired throughput.

Additional buffers may be added in each datapath. For example, buffers 414 and 424 may be optionally added on wires (ra, x) and (ra, y) to decouple the control parts 114 and 124, respectively.

Since decoupling buffers may increase the latency of an asynchronous pipeline, a proper balance between the latency requirement and the throughput requirement should be maintained when introducing such buffers.

A stage in an asynchronous circuit usually performs both sending and receiving. One simple example is a one-place buffer having a register, an input port L, and an output port R. This buffer repeatedly receives data on the port L, and sends the data on the port R. The register that holds the data is repeatedly written and read.

It is observed that the completion mechanism for the control 114 in the sending stage 110 and the completion mechanism for the control 124 in the receiving stage 120 are similar in circuit construction and function. Since data is almost never read and written simultaneously, such similarity can be advantageously exploited to share a portion of the pipelined completion mechanism between sending data and receiving data within a stage. This simplifies the circuit and reduces the circuit size.

Figure 5:
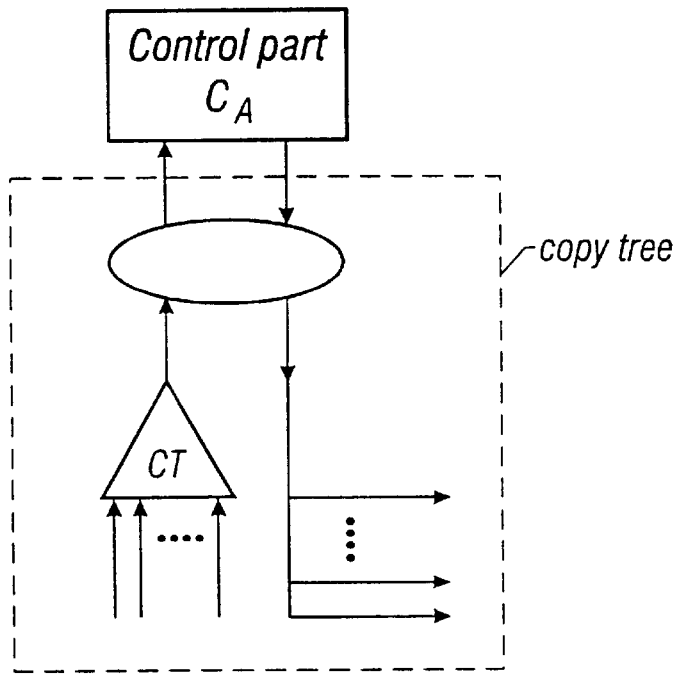
FIG. 5 shows a copy tree circuit.

In particular, distributing the control signals from the control part in each stage to data cells and merging the signals from all data cells to the control part can be implemented by sharing many circuit elements. In FIG. 4, a portion of circuit, a "copy tree" is used in both stages. This copy tree is shown in FIG. 5. The copy tree includes two pipelined circuits: a pipelined completion tree circuit for sending a completion signal based on completion signals from data cells to the global control part in each stage and a pipelined distribution circuit for sending control signals from the global control part to data cells.

Figure 6:
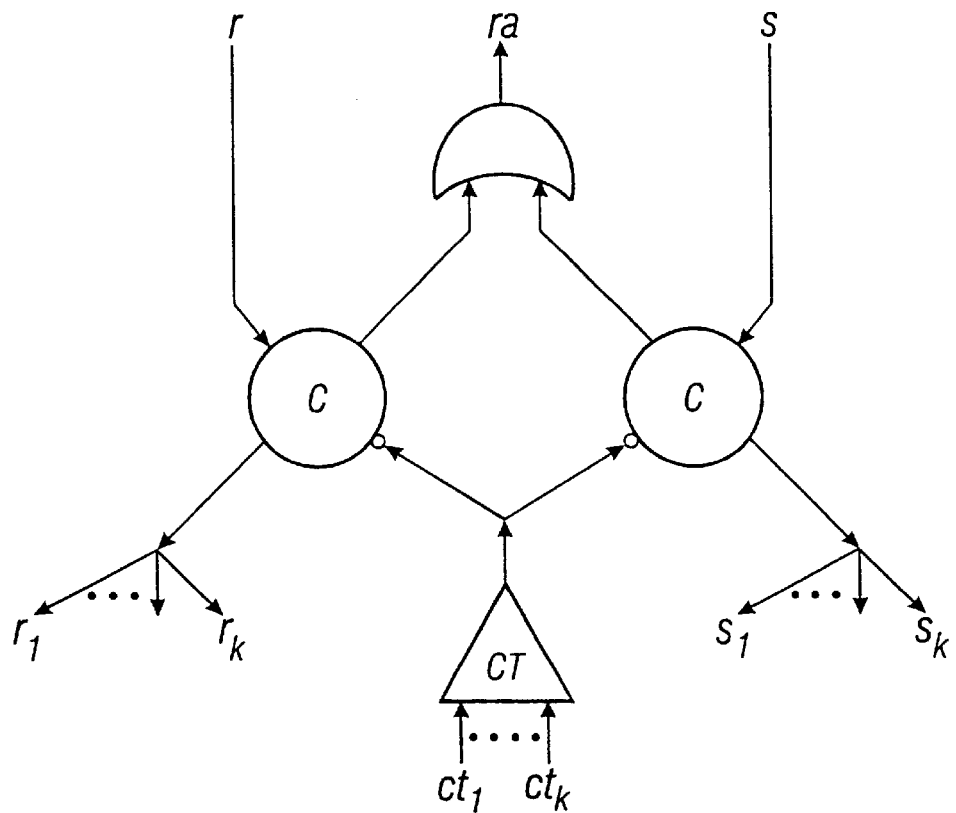
FIG. 6 shows one embodiment of the copy tree in FIG. 5.

FIG. 6 shows one embodiment of a copy tree for a stage that has k data cells. This copy tree is used for both distributing k control signals from the control part (e.g., 114 in FIG. 4) to all data cells and merging k signals from all data cells to the control part. The signals $r_i$, $s_i$ are signals going to data cells, ($1 \leq i \leq k$), as requests to receive or send. The completion signal $ct_i$ comes from data cell i, as a request/acknowledgment signal. One advantage of this copy tree is that only one completion tree is needed to perform the functions of the two completion trees 410 and 420 in FIG. 4.

The copy tree shown in FIG. 6 is only an example. Other configurations, are possible. In general, a program specification of a copy tree for both sending and receiving is as follows:

$$*[C?c; < \|i; 1 \ldots k : D_i!c >]$$

where C is the channel shared with the control, $D_1 \ldots D_x$ are the channels to each data cell, and c is the value encoding the request (receive, send, etc.). The different alternatives for the buffer correspond to the different implementations of the semicolon.

In the above circuits, each data cell i contains a control part that communicates with a respective copy tree through the channel $D_i$. In certain applications, the copy tree and the control for each data cell may be eliminated.

Consider a data cell i that receives data from a channel Li, and sends out data to a channel Ri. Assuming that the requests from the copy tree to the data cells are just receive ("r") or send ("s"), a program specification of data cell i is:

$$*[[D^i = "r" \rightarrow D^i; L^i ? x i \square D^i = "s" \rightarrow D^i; R^i ! x i]]$$

The program generalizes obviously to any number of requests. Again, we have the choice among all possible implementations of the semicolon (the buffer between channel $D_i$ and channel Li or Ri). If the sequence of requests is entirely deterministic, like in the case of a buffer: r, s, r, s, . . . , there is no need for each data cell to communicate with a central control process through the copy tree. The fixed sequence of requests can be directly encoded in the control of each data cell, thereby eliminating the central control and the copy tree. Hence, the control is entirely distributed among the data cells. A central control process is usually kept when the sequence of send and receive actions in the data cells is data dependent.

Figure 7A:
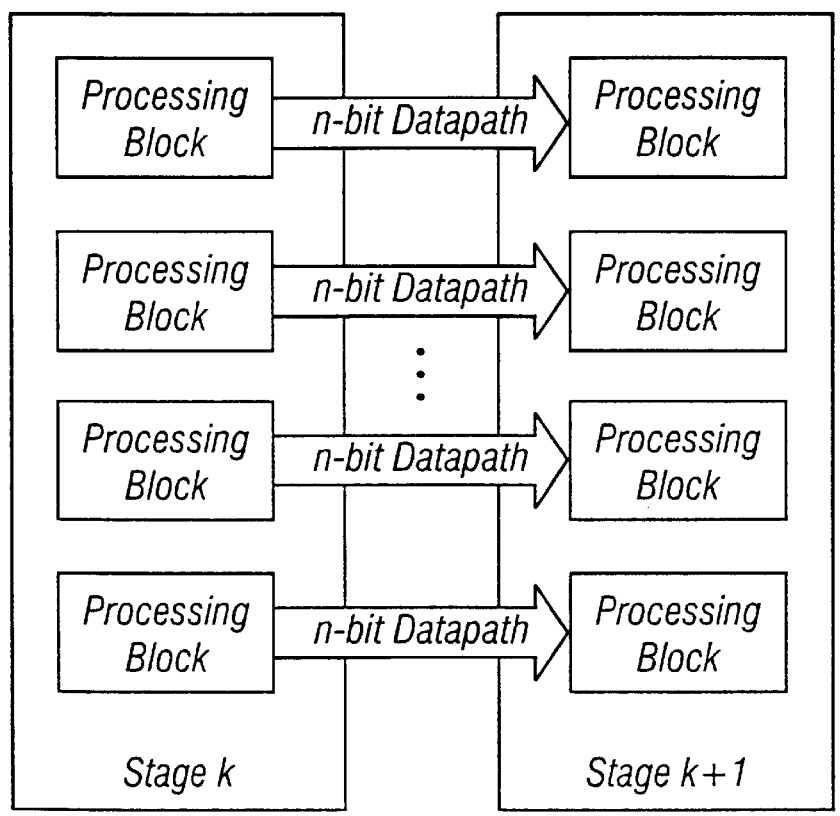
FIG. 7A is a diagram illustrating decomposition of an N-bit datapath of an asynchronous pipeline into two or more parallel datapaths with each having a processing block to process a portion of the N-bit data.

One technique used in FIG. 4 is to decompose the N-bit data path into m small datapaths of n bits. Since each small datapath handles only a small number of bits of the N bits, the data processing logic and the control can be integrated together to form a single processing block without having a separate control part and a register. The registers in each stage shown in FIG. 4 can be eliminated. Therefore, the global control part in each stage is distributed into the multiple processing blocks in the small datapaths. Without the register, the data in each processing block can be stored in a buffer circuit incorporated in the processing block. Such implementation can usually be accomplished based on reshuffling of half buffer, precharged half buffer, and precharged full buffer disclosed in U.S. application Ser. No. 09/118,140, filed on Jul. 16, 1998, which is incorporated herein by reference. Reshuffling can be used to advantageously reduce the forward latency. FIG. 7A shows one embodiment of an asynchronous circuit by implementing multiple processing blocks.

Figure 7B:
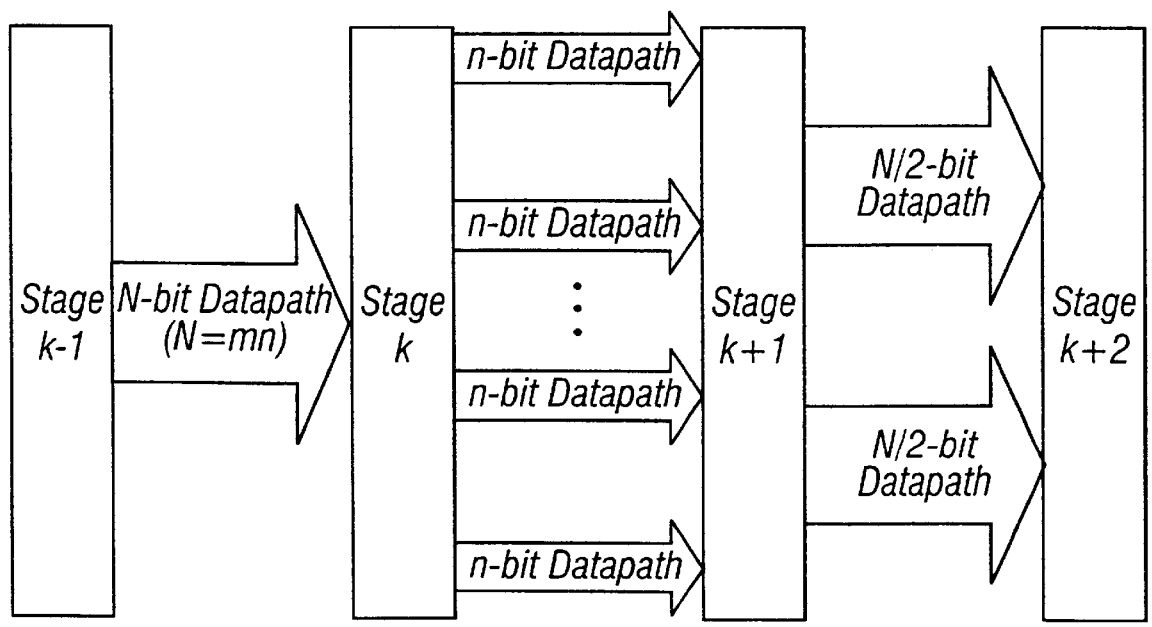
FIG. 7B is a diagram showing different datapath structures at different stages in an asynchronous pipeline.

In addition, the datapaths between different stages in an N-bit asynchronous pipeline may have different datapath structures to reduce the overall delay. The difference in the datapaths depends on the nature and complexity of these different stages. One part of the N-bit pipeline, for example, may have a single N-bit data path while another part may have m n-bit datapaths. FIG. 7B shows three different datapath structures implemented in four pipelined stages.

Figure 7C:
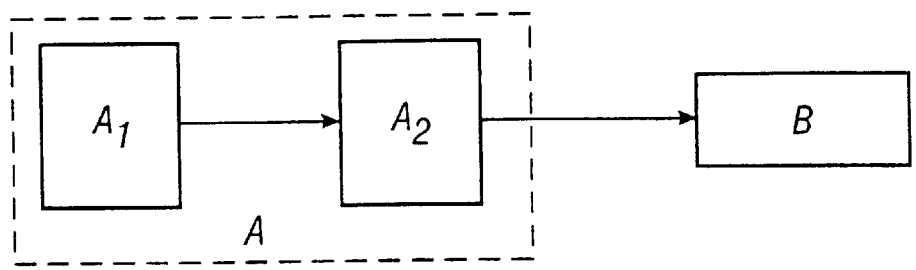
FIG. 7C shows a modified circuit of the asynchronous pipeline in FIG. 7A where a processing stage is decomposed into two pipelined small processing stages to improve the throughput.

FIG. 7C shows another example of decomposing a long cycle into small cycles based on the circuit in FIG. 7A. The pipelined stage A can be decomposed into two pipelined stages A1 and A2. Each processing block of the stages A1 and A2 is simplified compared to the processing block in the original stage A. Each stage, A1 or A2, performs a portion of the processing task of the original stage A. When A1 and A2 are properly constructed, the average throughput of the stages A1 and A2 is higher than that of the original stage A.

Decomposition of an N-bit datapath into multiple small datapaths shown in FIG. 7A allows each small datapath to process and transmit a portion of the data. For example, the first small datapath handles bits 1 through 8, the second small datapath handles bits 9 through 18, etc. As long as each small datapath can proceed entirely based on its own portion of the data and independently of other data portions, synchronization of different small datapaths and a global completion mechanism are not needed. This rarely occurs in most practical asynchronous processors except some local processing or pure buffering of data. In a pipeline where the data is actually transformed, the pipelined stages are often part-of a logic unit (e.g., a fetch unit or a decode unit). Each processing block in stage k+1 usually need read some information from two or more different processing blocks in the stage k. Hence, the decomposed small datapaths need to be synchronized relative to one another.

Figure 8:
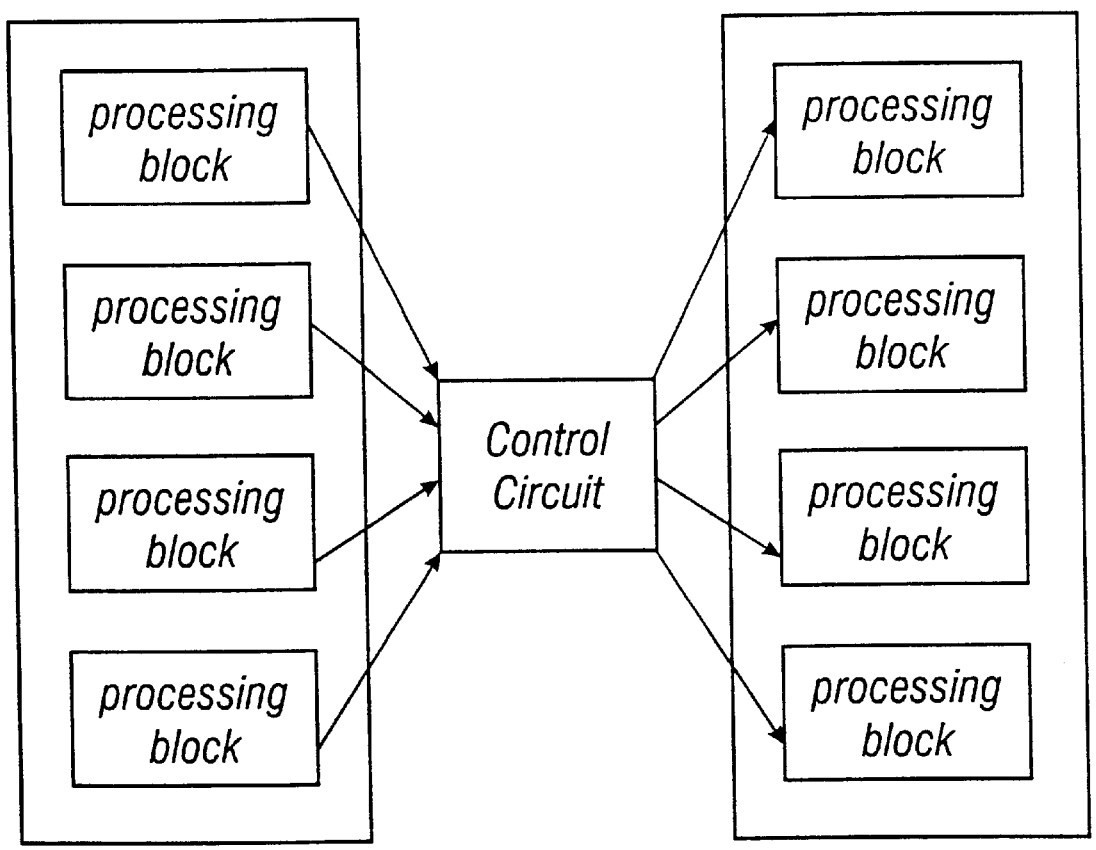
FIG. 8 shows an asynchronous circuit having a control circuit to synchronize decomposed processing blocks of two different processing stages.

One way to implement such synchronization is illustrated in FIG. 8. A control circuit is introduced between the stage k and stage k+1 to gather global information from each processing block of stage k and computes appropriate control signals to control the related processing blocks in stage k+1. Decomposed datapaths are not shown in FIG. 8. For example, the stage k compares two 32-bit numbers A and B and the operations of the stage k+1 depend on the comparison result. The control circuit produces a control signal indicating the difference (A−B) based on the signals from the decomposed datapaths in the stage k. This control signal is then distributed to all decomposed blocks in the stage k+1.

One aspect of the control circuit is to synchronize the operations of the two stages k and k+1. Similar to the connections between the control part 114 and the data cells in the stage 110 of FIG. 4, a copy tree can be used to connect the control circuit to each of the stages k and k+1. To maintain a high throughput and reduce the latency, the copy trees are preferably implemented as pipelined completion circuits. For example, each processing block in the stage k is connected to a block completion tree for that block. The block completion tree is then pipelined to a global completion tree via a decoupling buffer. The output of the global completion tree is then connected to the control circuit. This forms the pipelined completion tree in the copy tree that connects the stage k to the control circuit.

When the control circuit distributes a multi-valued control signal to stage k+1, the single control wire of a basic completion tree needs to be replaced with a set of wires encoding the different values of the control signal. The copy tree shown in FIG. 6 can be extended in the case of a two-valued signal encoded by wires r and s.

The control circuit in FIG. 8 can introduce an extra delay between the stage k and k+1, in particular since the pipelined completion tree used usually has a plurality of decoupling buffers. This delay can form a bottleneck to the speed of the pipeline. Therefore, it may be necessary in certain applications to add buffers in a datapath between the stages k and k+1 in order to substantially equalize the length of different channels between the two stages. This technique is called "slack matching".

Figure 9A:
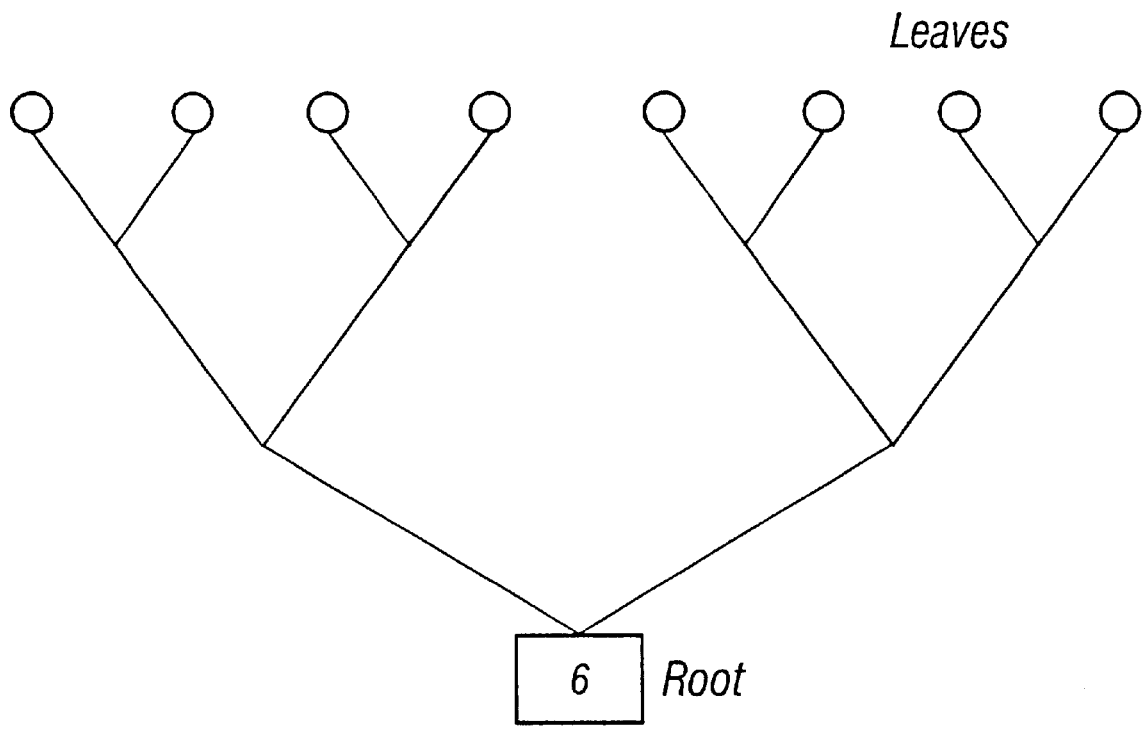
FIG. 9A shows a balanced binary tree.
Figure 9B:
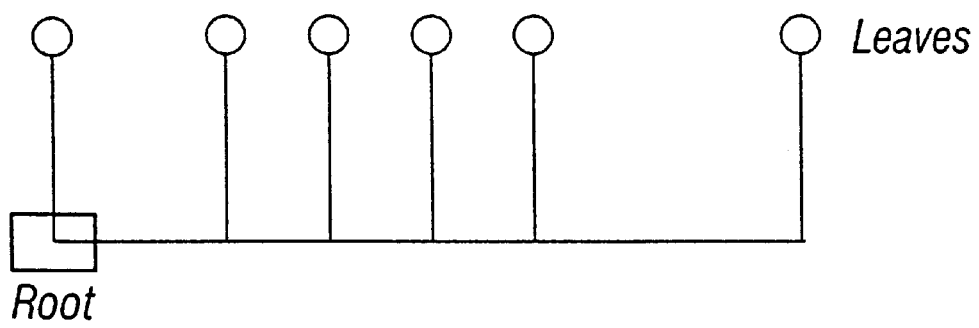
FIG. 9B shows a skewed binary tree.
Figure 9C:
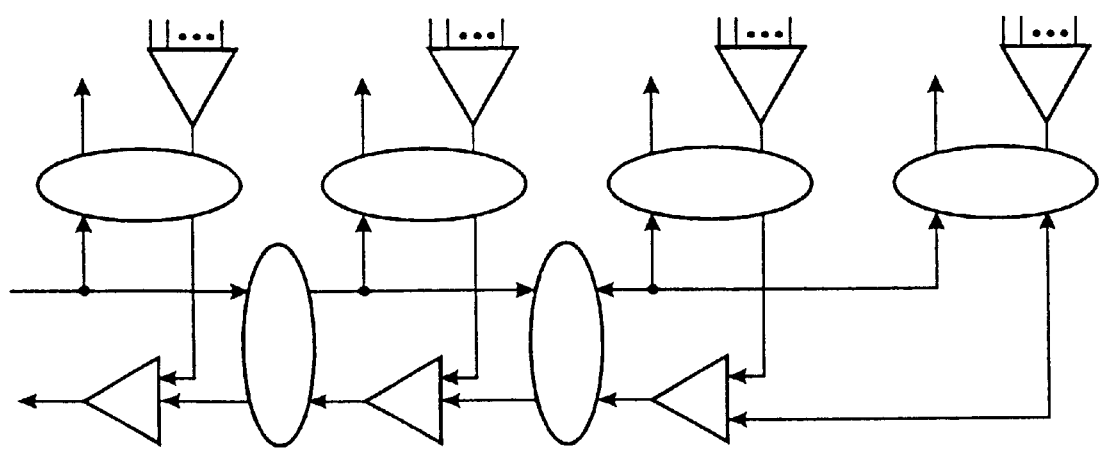
FIG. 9C shows a 4-leaf skewed completion tree.
Figure 9D:
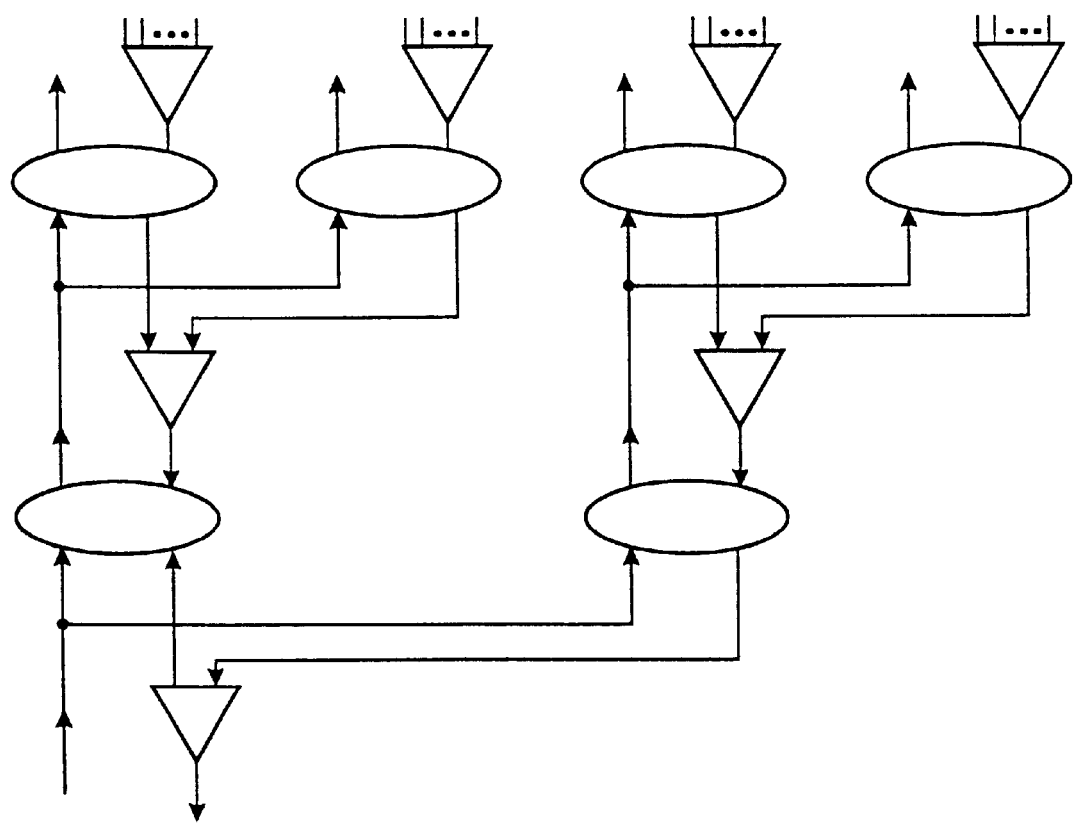
FIG. 9D shows a 4-leaf balanced completion tree.

The above pipelined completion circuits are balanced binary tree in which the distances from the root to leaves are a constant. FIG. 9A shows a balanced binary tree. In general, a tree used in the present invention may not be balanced or binary. For example, a binary tree can be skewed as shown in FIG. 9B. FIG. 9C shows a 4-leaf skewed completion tree and FIG. 9D shows a balanced 4-leaf completion tree.

The above embodiments provide a high throughput and a low latency by decomposing any pipeline unit into an array of simple pipeline blocks. Each block operates only on a small portion of the datapath. The global completion delay is essentially eliminated. Global synchronization between stages is implemented by copy trees and slack matching.

Although only a few embodiments are disclosed, other variations are possible. For example, the control circuit in FIG. 8 may be connected between any two stages other than two adjacent stages as shown. Also, the number of decoupling buffers between two stages can be varied. These and other variations and modifications are intended to be encompassed by the following claims.

What is claimed is:

1. A pipelined completion element for a processor, comprising:
    a completion process producing a request and receiving an acknowledgment that said request has been completed from each of a plurality of different processes, including at least a first process, completing said request; and
    a pipelining element, including at least one buffer that senses a command for an action to occur in said completion process and returns an indication that said buffer has received said command, and decomposes a pipeline cycle into two shorter cycles, wherein said completion process, said plurality of different processes, and said pipelining element communicate under an asynchronization protocol without a common clock signal.

2. An element as in claim 1 when said completion process is a completion tree and said pipelining element pipelines each of said plurality of different processes.

3. An element as in claim 1, further comprising a second process, receiving said request, acting on said request, and sending an acknowledge that said request has been completed.

4. An element as in claim 2, wherein said completion tree signifies an output is active when each of the plurality of bits of a multibit signal are all finished.

5. A device as in claim 3, wherein said first and second processes operate without a common clock therebetween.

6. A device as in claim 3, wherein said completion process receives an indication of completion prior to said second process actually completing said task.

7. A method of operating a processor, comprising:
    communicating between first and second processes which do not use a common clock therebetween, where said first process operates asynchronously relative to said second process;
    sending a plurality of related commands from said first process to said second process;
    pipelining responses of all of plurality of commands from said second processes back to said first process and then using said pipelined commands to form a pipelined completion tree indicating completion of said plurality of commands from said first process; and
    decomposing a processing cycle in the pipelined completion tree into at least two shorter cycles to reduce a delay in the pipelined completion tree.

8. The method as in claim 7, further comprising:
    partitioning a datapath of the processor into a plurality of smaller parallel datapaths; and
    processing the smaller parallel datapaths in parallel based on the asyncrhronous operation, the pipelined completion, and the decomposition of a processing cycle into at least two shorter cycles.

9. An asynchronous circuit, comprising a pipelined completion tree operating without a common clock and having a plurality of completion tree stages and at least one decoupling buffer coupled between two adjacent and pipelined completion tree stages to reduce a cycle between said two adjacent and pipelined completion tree stages into two shorter cycles.

10. The circuit as in claim 9, further comprising a plurality of pipelined data processing stages coupled to said pipelined completion tree, wherein said pipelined completion tree includes a copy tree shared by two adjacent pipelined data processing stages to processing at least a portion of completion signals from both said two adjacent pipelined data processing stages.

* * * * *

UNITED STATES PATENT AND TRADEMARK OFFICE
CERTIFICATE OF CORRECTION

PATENT NO. : 6,502,180 B1
DATED : December 31, 2002
INVENTOR(S) : Alain J. Martin, Andrew M. Lines and Uri V. Cummings It is certified that error appears in the above-identified patent and that said Letters Patent is hereby corrected as shown below:

<u>Title page,</u>
Replace Item [63], Related U.S. Application Data as follows:

-- Divisional of application No. 09/151,334, filed on September 11, 1998, which is a continuation-in-part of application No. 09/118,140, filed on Jul. 16, 1998, now Pat. No. 5,982,963. --

Signed and Sealed this

Twentieth Day of May, 2003

JAMES E. ROGAN
*Director of the United States Patent and Trademark Office*